(12) United States Patent
Ghosh

(10) Patent No.: US 7,577,637 B2
(45) Date of Patent: Aug. 18, 2009

(54) COMMUNICATION OPTIMIZATION FOR PARALLEL EXECUTION OF USER-DEFINED TABLE FUNCTIONS

(75) Inventor: Bhaskar Ghosh, Burlingame, CA (US)

(73) Assignee: Oracle International Corporation, Redwood Shores, CA (US)

( * ) Notice: Subject to any disclaimer, the term of this patent is extended or adjusted under 35 U.S.C. 154(b) by 447 days.

(21) Appl. No.: 11/204,409

(22) Filed: Aug. 15, 2005

(65) Prior Publication Data
US 2007/0038658 A1 Feb. 15, 2007

(51) Int. Cl.
*G06F 17/30* (2006.01)
(52) U.S. Cl. .......................................... 707/2; 707/101
(58) Field of Classification Search .................. 707/2, 707/5, 101
See application file for complete search history.

(56) References Cited

U.S. PATENT DOCUMENTS

| | | | | |
|---|---|---|---|---|
| 5,857,180 | A * | 1/1999 | Hallmark et al. | 707/2 |
| 6,112,198 | A | 8/2000 | Lohman et al. | 707/3 |
| 6,665,684 | B2 * | 12/2003 | Zait et al. | 707/102 |
| 6,691,101 | B2 * | 2/2004 | MacNicol et al. | 707/2 |
| 7,103,588 | B2 * | 9/2006 | Beck et al. | 707/2 |
| 2007/0208690 | A1 * | 9/2007 | Schneider et al. | 707/2 |

OTHER PUBLICATIONS

"General Case: Function behavior depends on the partitioning of the input data" retrieved on Dec. 23, 2005 from the Internet <URL: http://www.oracle.com/technology/sample_code/tech/pl_sql/htdocs/x/Table_Functions_C...> (Sep. 2, 2003) pp. 1-2.

"Pipelined Table Functions—New in Oracle 9i" retrieved on Dec. 23, 2005 from the Internet <URL: http://www.oracle.com/technology/sample_code/tech/pl_sql/htdocs/x/Table_Functions_C...> (Sep. 2, 2003) pp. 1-2.

"Piping data from one Table Function to the next—New in Oracle 9i" retrieved on Dec. 23, 2005 from the Internet: <URL: http://www.oracle.com/technology/sample_code/tech/pl_sql/htdocs/x/Table_Functions13 C...> (Sep. 2, 2003) pp. 1-2.

"Special Case: Function behavior is independent of the partitioning of the input data" retrieved on Dec. 23, 2005 from the Internet <URL: http://www.oracle.com/technology/sample_code/tech/pl_sql/htdocs/x/Table_Functions_C...> (Sep. 2, 2003) p. 1.

* cited by examiner

*Primary Examiner*—Hosain T Alam
*Assistant Examiner*—Amy Ng
(74) *Attorney, Agent, or Firm*—Hickman Palermo Truong & Becker LLP

(57) ABSTRACT

While generating an execution plan for a database statement that includes a user-defined table function that requires partitioning of input data to the function, it is determined whether the partitioning of output data from an operation that feeds the function is compatible with the partitioning required by the function. If the partitioning of output data from the operation that feeds the function is compatible with the partitioning required by the function, then the execution plan is constructed to specify execution of both (1) the function and (2) the operation that feeds the function, by a same set of processes. For example, the operation that feeds the function and the function itself are clumped into the same sub-plan or sub-tree, which is scheduled and run in parallel on a set of parallel execution slaves.

24 Claims, 2 Drawing Sheets

COMMUNICATION OPTIMIZATION FOR PARALLEL EXECUTION OF USER-DEFINED TABLE FUNCTIONS

FIELD OF THE INVENTION

The present invention relates generally to data management and, more specifically, to optimizing parallel execution of user-defined data transformations and functions (e.g., Table Functions).

BACKGROUND

Database applications interact with a database server by submitting to the database server commands that cause the database server to perform operations on data stored in a database. A database command that is sent from a database application to a database server contains the "original statement" of the database command. For the database server to process the commands, the commands must conform to a database language supported by the database server. One database language supported by many database servers is known as the Structured Query Language (SQL).

Database Command Compilation

When a database server receives the original statement of a database command from a database application, the database server must first determine which actions should be performed in response to the database command, and then perform those actions. The act of preparing for performance of those actions is generally referred to as "compiling" the database statement or command, while performing those actions is generally referred to as "executing" the database statement or command.

During the compilation of a query statement (e.g., a SQL statement), the database server may perform a significant amount of preliminary work for the statement, such as parsing, semantic analysis, and query plan generation. One set of information generated during compilation is the execution plan for performing the operations specified by the query statement.

One method of representing an execution plan is a row-source tree. At execution, traversal of a row-source tree from the bottom up yields a sequence of steps for performing the operation(s) specified by the database statement. A row-source tree is composed of row-sources. During the compilation process, row-sources are allocated, and each row-source is linked to zero, one, two, or more underlying row-sources. The makeup of a row-source tree depends on the database statement and the decisions made by a database server query optimizer during the compilation process. Typically, a row-source tree is comprised of multiple levels. The lowest level, the leaf nodes, access rows from a database or other data store. The top row-source, the root of the tree, produces, by composition, the rows of the query that the tree implements. The intermediate levels perform various transformations on rows produced by underlying row-sources. A row-source typically includes data about the execution plan, such as SQL operation, position, object identification, and number of rows processed by a single row-source within an execution plan.

The row-source tree representation of execution plans is described in detail in U.S. Pat. No. 5,857,180, entitled "Method and apparatus for implementing parallel operations in a database management system", issued to Hallmark et al. on Jan. 5, 1999, the entire contents of which are incorporated herein. Hallmark also describes a "row-source approach" for parallelizing the operations required by an SQL command by parallelizing portions of the execution plan of the query.

Parallel Execution of a Query

Sequential query execution uses one processor and one storage device at a time. In contrast, parallel query execution uses multiple processes to execute, in parallel, suboperations of a query. For example, virtually every query execution includes some form of manipulation of rows in a relation, or table, of the database management system (DBMS). Before any manipulation can be done, the rows must be read, or scanned. In a sequential scan, the table is scanned using one process. Parallel query systems provide the ability to break up the scan such that more than one process can get involved in performance of the table scan.

Various techniques have been developed for parallelizing queries. Such techniques typically rely on an underlying query processing model. For example, one model (a "row-source model") for parallelizing queries is described in U.S. Pat. No. 5,857,180, which was mentioned above. According to the row-source (iterator) model of SQL execution, data flows through the SQL operations modeled by a row-source in the form of row-vectors. Specifically, a parallel plan is built on the Query Coordinator (QC). The parallel plan is subdivided into sub-plans or sub-trees, each called a DFO (Data Flow Object), each of which are scheduled and run in parallel on a set of parallel execution slaves.

Table Functions

Table functions are functions which produce a set of rows as output. The set of rows produced by a table function may be treated as a "virtual" table. Thus, any database statement used for manipulating data in a table may be used to manipulate data produced by a table function.

A database command that includes a table function is referred to herein as a "table function statement". Table function statements, and the execution thereof, are described in greater detail in U.S. patent application Ser. No. 09/939,311, entitled "METHOD AND SYSTEM FOR PARALLEL EXECUTION OF TABLE FUNCTIONS", filed on Aug. 24, 2001, the content of which is incorporated by this reference in its entirety for all purposes as if fully disclosed herein; and in U.S. patent application Ser. No. 09/938,982 entitled "METHOD AND SYSTEM FOR PIPELINED DATABASE TABLE FUNCTIONS", filed on Aug. 24, 2001, the content of which is incorporated by this reference in its entirety for all purposes as if fully disclosed herein.

Table functions were introduced into database systems to support user-defined transformations inside the database server. Thus, a table function is a non-native function registered with and stored inside the database (e.g., by an application or end user). Herein, the terms "table function" and "user-defined table function" are used interchangeably, with the only restriction being that the function is used in a FROM clause of a query and have an argument which specifies a stream of rows from a sub-query (e.g., a ref-cursor argument), as shown by example hereafter. Because table functions are important in the transform phase of an ETL (Extract Transform Load) process of data-warehousing, it is important to support parallelism as a means of making table functions performant and scalable.

One approach to parallelized processing of table functions enforces partitioning of the input stream to table functions, so that each slave process working on the table function receives a "predefined" subset of the input data. The input stream to a table function corresponds to the output stream of the operation below the table function (e.g., the table functions "ref-cursor") in the row-source tree.

Because the logic implemented in a table function is user-defined, it is typical that the table function developer defines the correct and performant partitioning strategy for the function's input stream. Three different partitioning strategies are commonly supported in database systems: ANY, HASH and RANGE.

ANY specifies that the table function is indifferent as to how the input stream to the table function is repartitioned among various table function slaves.

HASH(x) specifies that the input stream to the table function should be repartitioned by a suitable (server-defined) hash function on column x of the ref-cursor.

RANGE(x) specifies that the input stream to the table function should be repartitioned by range on column x of the ref-cursor.

A table function's partitioning method is typically enforced using a data redistribution operation (e.g., a "Table Queue" or "PX SEND") between the table function and the operation below the table function in the row-source tree. In other words, the execution plan for a database statement that includes a table function is constructed to include a redistribution of the data stream output from the table function's ref-cursor, to send subsets of the output data to each of the table function slaves.

For example, a parallel table function row-source (which is represented as a COLLECTION ITERATOR row-source in the execution plan) always had a redistribution Table Queue below. This redistribution operation enforced the redistribution strategy specified by the PARALLEL PARTITION BY clause of the table function, on the rows flowing up from the slaves executing the top row-source corresponding to the ref-cursor query block to the slaves executing the table function (i.e., collection iterator) row-source.

Consider the following simple table function, F, which requires a hash partitioning on one attribute (col1) of its ref-cursor (C_cursor).

```
create function
    F(C_cursor refcursor_type)
    return tab_of_records
    parallel_enable(partition C_cursor
        by HASH(col1)) is
begin
...
return (record(col1, col2, col3));
end.
```

Thus, function F is to be parallelized by HASH partitioning the rows from cursor "C_cursor" on column "col1."

Now consider the following invocation of the function F:

```
SELECT col1, f_sum_col2
FROM
    TABLE(F(CURSOR(
        SELECT col1, sum(col2) as sum_col2
        FROM tab
        GROUP BY col1))
```

In one approach to such a database statement, the group-by aggregation is typically parallelized using HASH redistribution to slaves based on the GROUP BY columns. Hence, the execution plan for this parallel query has three DFOs, as represented below.

```
PX COORDINATOR
|
(third DFO follows)
COLLECTION ITERATOR (function F)
|
(second DFO follows)
PX SEND (hash on col1)
GROUP BY AGGRN
|
(first DFO follows)
PX SEND (hash on col1)
PX BLOCK
TABLE SCAN (tab)
```

This plan requires two redistributions of data through table queues (i.e., PX SEND), and communication of the redistributed data to other sets of slave processes. Of course, the communications between producer and consumer slave processes, which may execute on different system nodes, require system resources. Further, the more a database system parallelizes its operations, generally, the more complex are the server's query execution plans (e.g., the execution plan includes relatively many redistribution table queues). However, minimization of communications between producer and consumer processes is desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
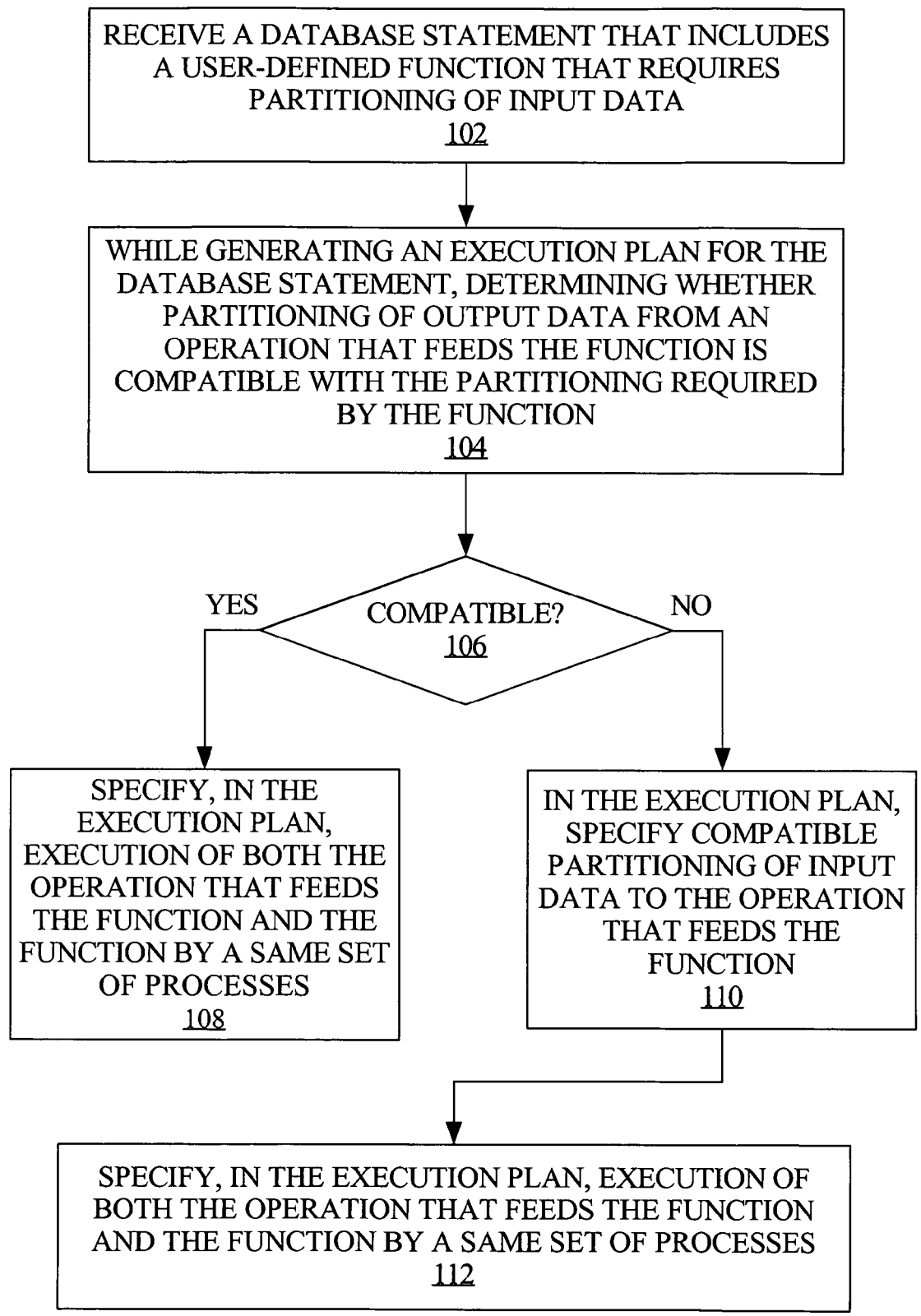
FIG. 1 is a flow diagram that illustrates a method for managing compilation of a database statement that includes a function that requires partitioned input data, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

For example, techniques are described throughout in the context of user-defined table functions. However, embodiments of the invention are not limited to use only with table functions. Rather, embodiments of the invention can be implemented for use with any non-native executable function that is registered with and stored in a database system, and which requires or specifies partitioning of input data for the function.

Function Overview of Embodiments

Optimization techniques are described for parallel execution of user-defined table functions in a database system. A database server receives a database statement which includes a user-defined table function that requires or specifies partitioning of input data to the function (e.g., a table function statement). While generating an execution plan for such a database statement, it is determined whether the partitioning of output data from an operation that feeds the function is compatible with the partitioning required by the function. If so, then the execution plan is constructed to specify execution of both (a) the operation that feeds the function and (b) the function, by a same set of processes. For example, the operation that feeds the function and the function itself are combined into the same sub-plan or sub-tree (e.g., a DFO), which is scheduled and run in parallel on a set of parallel execution slaves. Consequently, a data redistribution table queue between the operation and the function is avoided and computational and communication costs are reduced. Combining multiple operations together in the same execution sub-plan or sub-tree, such as the same DFO, is referred to herein as "clumping."

A PREVIOUS EXAMPLE

Returning to the foregoing table function F which requires a hash partitioning on one attribute (col1) of its ref-cursor, a significant observation is that the redistribution requirements of the function F match the redistribution (or stream partitioning) already being enforced on the sub-plan below it, i.e., starting at the root of the query plan corresponding to the ref-cursor query block. That is, both redistributions are HASH on col1. Hence, the second redistribution of data between the GROUP BY and the table function is unnecessary. The table function F can be evaluated on the same set of slaves that performs the GROUP BY aggregation operation, i.e., the table function should be evaluated in the same DFO as the child row-source.

Hence, according to an embodiment of the invention, the execution plan for this parallel query has only two DFOs instead of three DFOs (as would be the case with the previous approach). The execution plan for parallel query is represented below.

```
PX COORDINATOR
|
(second DFO follows)
COLLECTION ITERATOR (function F)
GROUP BY AGGRN
|
(first DFO follows)
PX SEND (hash on col1)
PX BLOCK
TABLE SCAN (tab)
```

Generally, the rules for clumping parallel table functions with the operations that feed the table functions are dependent on the PARTITION BY clause in the function definition, as illustrated herein in greater detail through use of examples.

A Method for Managing Compilation of a Database Statement

FIG. 1 is a flow diagram that illustrates a method for managing compilation of a database statement that includes a function that requires partitioned input data, according to an embodiment of the invention. The process illustrated in FIG. 1 is implemented for automated performance by a conventional computing system, such as computer system 200 of FIG. 2.

At block 102, a database statement is received which includes a user-defined table function that requires partitioned input data. For example, an SQL statement that includes a table function statement is received at a database server. Generally, a server is combination of integrated software components and an allocation of computational resources, such as memory, a node, and processes on the node for executing the integrated software components on a processor, where the combination of the software and computational resources are dedicated to providing a particular type of function on behalf of clients of the server. Among other functions of database management, a database server governs and facilitates access to a particular database, processing requests by clients to access the database.

Block 104 and block 106 are performed while generating an execution plan for the database statement. For example, blocks 104 and 106 are performed by a SQL engine of a database server as part of a query compilation process. At block 104, it is determined whether or not partitioning of output data from an operation that feeds the function is "compatible" with the partitioning required by the function. Examples of compatible partitioning methods are described in greater detail herein. Thus, at decision block 106, if the partitioning of the output data from the operation that feeds the function is compatible with the partitioning required by the function, then control passes to block 108. If, at decision block 106, the partitioning of the output data from the operation that feeds the function is not compatible with the partitioning required by the function, then control passes to block 110.

At block 108, because the partitioning method for the output data from the operation that feeds the function is compatible with the partitioning required by the function, execution of both the function and the operation that feeds the function, by a same set of processes, is specified in the execution plan for the database statement. For example, both the function and the operation that feeds the function are clumped together into the same DFO, for parallel-processing by a set of two or more slave execution processes. Consequently, a redistribution table queue and associated costs are avoided and a more optimized communication between parallel processes is enabled.

Determining Compatibility of Data Partitioning Methods

Ordering, clustering, and clumping techniques are used in a database server (e.g., in a SQL engine) to perform the following:

(a) ordering optimizations (e.g., remove an ORDER BY a if there is a GROUP BY a, b or GROUP BY a below the ORDER BY a in the row-source tree);

(b) clustering optimizations (e.g., push PARTITION iterator on a through a GROUP BY a so that the associated aggregation is performed per-partition, to exploit disk clustering); and (c) parallel clumping (e.g., clump an ORDER BY a and a GROUP BY a operations into the same DFO, and change the input partitioning requirements from HASH (a) to RANGE(a)).

The exact manner in which ordering/clustering/clumping information is maintained in a typical SQL engine while building the row-source tree from the bottom up may vary from implementation to implementation, and is beyond the scope of this description. However, one possible approach to maintaining such information is as follows.

(a) Ordering information for a row-source sub-tree is maintained as an ordered set of columns (c1, c2, c3, ... ), with an ASCENDING/DESCENDING flag and a NULLS FIRST/LAST flag for each column.

(b) Clustering information is maintained as an ordered set of columns with an associated clustering property (e.g., RANGE or HASH) for each column.

(c) Parallel clumping information is maintained as an ordered set of columns with an associated clumping property (e.g., RANGE, HASH, or RANDOM) for each column.

For each of the three foregoing properties, two adjacent operations in the row-source tree are subjected to compatibility tests and the resultant property from the top row-source is applied to the output stream from the top operation in that row-source. For example, if an ORDER BY (a, b) and GROUP BY (a) are clumped together into the same DFO, then the input table queue type is changed to RANGE(a) from HASH(a) and the parallel clumping of the output of this merged DFO is RANGE(a).

Returning to FIG. 1, at block 110, because the partitioning method for the output data from the operation that feeds the function is not compatible with the partitioning required by the function, compatible partitioning for both the function and the operation that feeds the function is specified in the execution plan for the database statement. That is, the input to the operation that feeds the function (e.g., the corresponding row-source, or ref-cursor) is specified, in the execution plan, for partitioning according to a method that is compatible with the function. For example, an appropriate table queue is placed before the operation that feeds the function, to redistribute the input data to the function in a manner that is compatible with the partitioning method required, or desired, by the function. Examples of specifying compatible partitioning for both the function and the operation that feeds the function are described in greater detail herein.

Thus, at block 112, execution of both the function and the operation that feeds the function, by a same set of processes, is specified in the execution plan for the database statement. For example, both the function and the operation that feeds the function are clumped together into the same DFO, for parallel processing by a set of two or more slave processes. Consequently, a redistribution table queue and associated costs are avoided between the feeding operation and the function.

As mentioned, the rules for parallel table functions are dependent on the PARTITION BY clause in the function definition, and examples of such dependencies follow.

Partitioning Method: Any

In a scenario in which the table function requires partitioning type "ANY", the table function is clumped with its child DFO. No redistribution or round robin table queue is required below this table function DFO. For example, if the function is operating on rows produced by a parallel table scan as in the following query:

```
SELECT col1, f(col2)
FROM
    TABLE(F(CURSOR(
        SELECT col1, col2
        FROM tab);
``` then the corresponding execution plan is illustrated as follows:

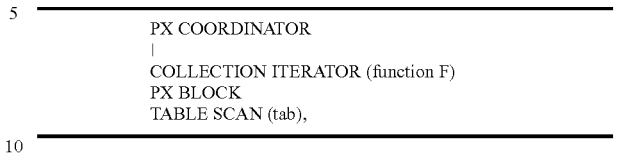

where the table scan and function are clumped together in the same DFO for execution by the same set of slave processes.

Partitioning Method: HASH(x,y)

With hash partitioning based on a composite key, e.g., HASH(x,y), all (i.e., assuming a perfect hash function) of the same composite key values are hashed to the same partition. For example, using (first_name; last_name) as a composite key, the same first_name; last_name ordered combinations will hash to the same partition.

If the table function requires input data partitioned by a HASH(x,y) method, then the table function is clumped with the function's preceding operation (e.g., the "child DFO") if the child DFO provides any one of HASH(x) or HASH(x,y) or HASH(y) or RANGE(x) or RANGE(x,y). Conventional prefix-based tests and permuting logic, such as that used for a parallel GROUP BY, can be used to determine whether the child DFO partitioning method is compatible with the table function partitioning method, or how to make the child DFO partitioning method compatible with the table function partitioning method. Essentially, if the prefix keys (i.e., a left to right subset of keys) of a composite key for any permutation of the keys for the table function-required HASH-partitioning method is matched by the keys from the child DFO partitioning method, and the child DFO's partitioning method is HASH or RANGE, then the child DFO and table function partitioning requirements are, or can be made, compatible. Hence, the table function operation and the child DFO can be clumped in the same DFO and be executed by the same set of slave processes.

For example, consider a table function that requires input data distributed by HASH(x,y,z) and the operation below the function is a GROUP BY(z). HASH(x,y,z) is effectively the same as HASH(z,y,x), and z is the prefix of HASH(z,y,x). Therefore, GROUP BY(z) is useable by the function, and the function and the GROUP BY can be clumped together for execution by the same set of processes. For this reason, HASH(y) is compatible with HASH(x,y). By contrast, a GROUP BY(z,q) is not compatible with HASH(x,y,z) due to the presence of the GROUP BY key q. Therefore, GROUP BY(z,q) should not be clumped together with the function for execution by the same set of processes.

HASH(x) and RANGE(x) are both compatible with HASH (x,y) because for each method, the same key values will hash to the same partition, which is compatible with the table function's partitioning requirement for parallel processing of the function. That is, all of the data items having the same value for x, using HASH(x) or RANGE(x), respectively, are ensured to be sent to the same slave process by nature of the HASH and RANGE methods, as required by the table function. However, if the table function's partitioning requirement is RANGE(x) and the child already has HASH(x), then in addition to clumping the two operations into the same DFO (e.g., at block 112 of FIG. 1), the table queue type feeding the child has to be changed from HASH(x) to RANGE(x) (e.g., at block 110 of FIG. 1) because RANGE(x) requires a global left-to-right ordering of data across slaves.

If the table function requires HASH(x,y) and the ref-cursor (essentially, the stream of data from the operation that feeds the function) performs a GROUP BY(y,x), then the redistribution into the GROUP BY is changed from its typical HASH(y,x) into HASH(x,y) (e.g., at block 110 of FIG. 1) so that the function and GROUP BY can be clumped into the same DFO (e.g., at block 112 of FIG. 1). The function receives the benefit of its input data being partitioned as required, whereas the parallelized GROUP BY operation can still operate on input data partitioned based on HASH(x,y) instead of HASH(y,x). This is because HASH(x,y) and HASH(y,x) both have the property of sending all rows with a fixed value of x and y (say, x=10 and y=20) to a unique slave, even though they may not be the same slave number in both cases because the hash function could use the keys left to right to compute the hash-value instead of taking a concatenated key. HASH partitioning simply requires an entire group (x,y) to be sent to the same slave and this property is maintained for any permutation of the keys.

Consider the following example. Using the technique described herein,

```
SELECT col1, col2, f_sum_col3
FROM
    TABLE(F(CURSOR(
        SELECT col1, col2, sum(col3) as sum_col3
        FROM tab
        GROUP BY col2, col1))
``` will generate the following clumped plan:

```
PX COORDINATOR
|
COLLECTION ITERATOR (function F)
GROUP BY (col1, col2)
PX RECEIVE
|
PX SEND HASH(col1, col2)
PX BLOCK
TABLE SCAN (tab)
``` instead of

```
PX COORDINATOR
|
COLLECTION ITERATOR (function F)
|
PX SEND HASH(col1, col2)
GROUP BY (col2, col1)
PX RECEIVE
|
PX SEND HASH(col2, col1)
PX BLOCK
TABLE SCAN (tab).
```

Consider the scenario in which the table function requires HASH(x,y) and the ref-cursor has an ORDER-BY(y,x) on top. The typical input redistribution into the ORDER-BY is RANGE(y,x). However, since HASH(x,y) and HASH(y,x) are equivalent, the table function will also be satisfied with HASH(y,x), so the function can clump into the same DFO as the child ORDER-BY (e.g., at block 112 of FIG. 1). In this scenario, the table queue feeding the ORDER-BY does not need to be changed.

Partitioning Method: RANGE(x,y)

With range partitioning based on a composite key, e.g., RANGE(x,y), all (i.e., assuming a perfect hash function) same composite key values are hashed to the same partition. If the table function requires input data partitioned by a RANGE(x,y) method, then the table function row-source is clumped with the child DFO if the child DFO provides any one of RANGE(x,y) or RANGE(x) or HASH(x) or HASH(x, y). For the latter two cases, the input HASH table queue to the DFO is changed from HASH to RANGE.

RANGE(x) is compatible with RANGE(x,y) because for each method, the same key values for x will typically hash to the same partition, which is compatible with the function's partitioning requirement for parallel processing of the function. That is, all of the data items having the same value for x, using RANGE(x), are ensured to be sent to the same slave process by nature of the RANGE method, as required by the function.

If the table function requires RANGE(x,y) and the ref-cursor performs an ORDER-BY(y,x), then the two partitioning methods are not compatible because RANGE keys cannot be permuted to fit the in-coming partitioning. Thus, the two operations belong in separate DFO's and there will be a RANGE(x,y) table queue feeding into the table function row-source.

Consider the following example in which the table function requires RANGE(col1, col2), and the input stream has an ORDER BY on col1. Using the technique described herein, the query:

```
SELECT col1, col2, f_sum_col3
FROM
    TABLE(F(CURSOR(
        SELECT col1, col2, col3
        FROM tab
        ORDER BY col1))
``` will generate the following clumped plan:

```
PX COORDINATOR
|
COLLECTION ITERATOR (function F)
ORDER BY (col1, col2)
PX RECEIVE
|
PX SEND RANGE(col1)
PX BLOCK
TABLE SCAN (tab)
``` instead of the following unclumped plan:

```
PX COORDINATOR
|
COLLECTION ITERATOR (function F)
PX RECEIVE
|
PX SEND RANGE(col1, col2)
ORDER BY (col1, col2)
PX RECEIVE
|
PX SEND RANGE(col1)
PX BLOCK
TABLE SCAN (tab)
```

Similarly, if the function requires RANGE(x,y) and the ref-cursor performs a GROUP BY(y,x), then the redistribution into the GROUP BY is changed from its typical HASH(y,x) into RANGE(x,y) (e.g., at block 110 of FIG. 1) so that the function and GROUP BY can be clumped into the same DFO (e.g., at block 112 of FIG. 1).

The foregoing examples illustrate how a table function row-source can be computed in the same DFO as its input ref-cursor, to prevent the cost of redistribution of input rows.

Propogation of Table Function's Clustering, Ordering and Clumping Information to Parent Row-Source A table function can feed into any arbitrary row-source, which may be another table function or some other row-source. A related issue is how the table function can propagate its own clustering/ordering/clumping information up the row-source tree, so that the consumer row-source (table function or otherwise) can make clumping decisions as described above. Propagating the ordering, clumping and clustering properties from a table function row-source up the row-source tree cannot be solved with a general solution because the user-defined logic inside the function can buffer the input rows and/or permute or resort them into an arbitrary order. However, propagating the ordering, clumping and clustering properties from a table function row-source up the row-source tree can be accomplished with syntactic support in the table function definition by adding clauses as follow.

1. OUTPUT_PARALLEL_CLUSTER (<CLUSTER_TYPE><keys>), where CLUSTER_TYPE can be HASH, RANGE or RANDOM and <keys> is an ordered set of column names.

2. OUTPUT_ORDERING(<ORDER_TYPE>, <keys>), where <ORDER_TYPE> can be a combination of ASCENDING/DESCENDING and NULLS FIRST/LAST (as for an ORDER BY clause), and <keys> is an ordered set of columns.

The preceding syntax enhancement enables a user-defined function, such as a table function, to expose its output data structure. Thus, a row-source allocation engine (e.g., a SQL engine) can use the ordering and parallel clustering information to make clumping decisions, as described herein, above the table function row-source.

Hardware Overview

Figure 2:
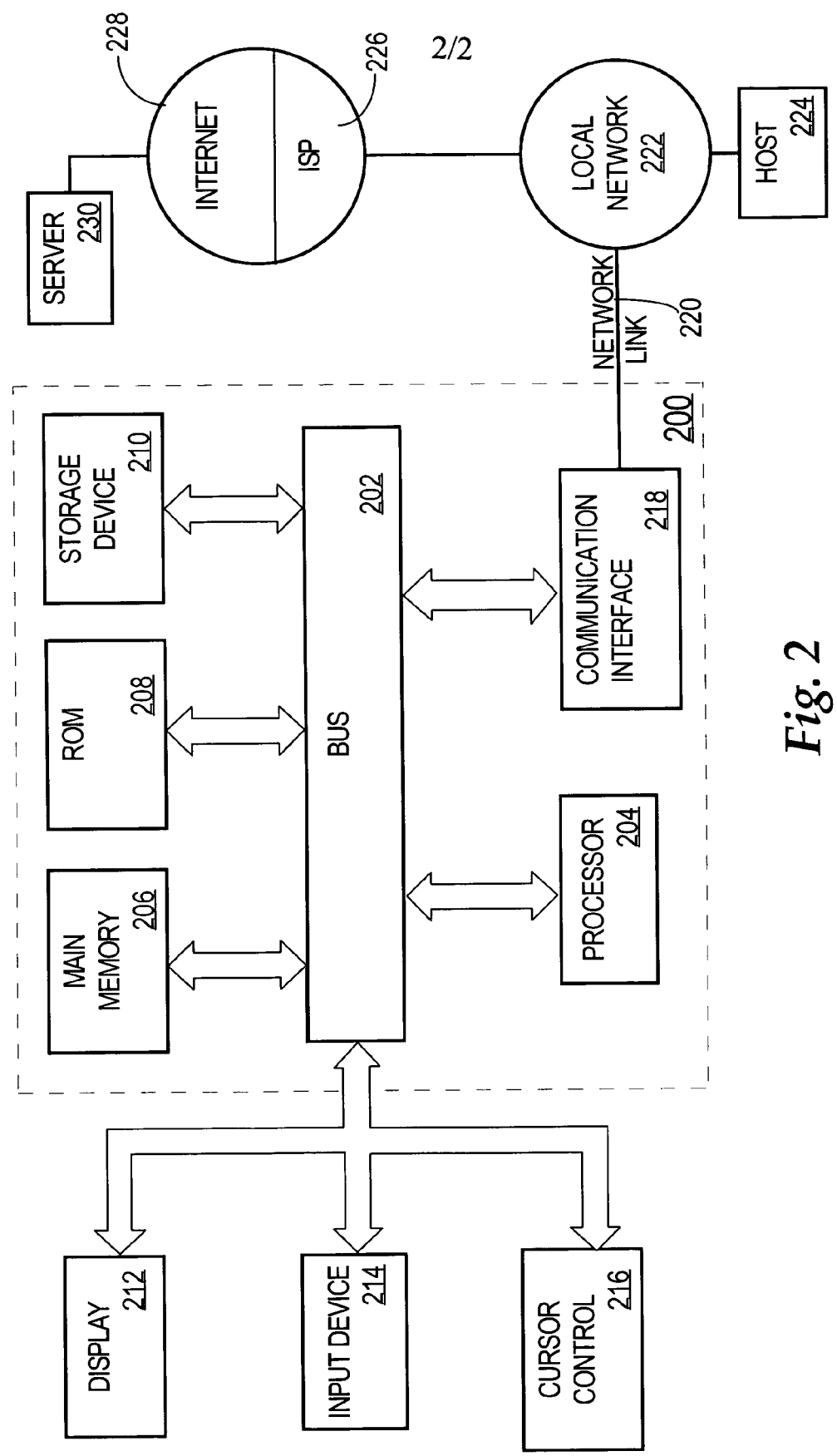
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for managing compilation of a database statement that includes a user-defined table function that requires partitioning of data input to the user-defined table function, the method comprising:

while generating an execution plan for the database statement, determining whether a partitioning of output data from an operation that feeds the user-defined table function is compatible with the partitioning required by the user-defined table function; and if partitioning of the output data from the operation that feeds the user-defined table function is compatible with the partitioning required by the user-defined table function, then specifying, in the execution plan, execution of both the operation that feeds the user-defined table function and the user-defined table function by a same set of processes;

wherein the user-defined table function is a non-native function that has been registered with a database system that manages compilation of the database statement;

wherein the partitioning required by the user-defined table function is specified in a function definition corresponding to the user-defined table function; and wherein the method is performed by one or more computing devices.

2. The method of claim 1, comprising:

specifying, in the execution plan, partitioning of input data to the operation that feeds the user-defined table function in a manner that is compatible with the partitioning required by the user-defined table function.

3. The method of claim 1, wherein specifying comprises specifying execution of both the operation that feeds the user-defined table function and the user-defined table function by a same set of processes, without specifying a redistribution operation on the output data from the operation that feeds the user-defined table function.

4. The method of claim 1, wherein the partitioning required by the user-defined table function is hash partitioning and the partitioning of the output data from the operation that feeds the user-defined table function is range partitioning.

5. The method of claim 1, wherein the partitioning required by the user-defined table function is hash partitioning based on values, for a composite key, from the output data from the operation that feeds the user-defined table function, and wherein the partitioning of the output data from the operation that feeds the user-defined table function is based on one from a group consisting of (a) hash partitioning based on values, from the output data, for the composite key and (b) hash partitioning based on values, from the output data, for any key from the composite key.

6. The method of claim 1, wherein the partitioning required by the user-defined table function is hash partitioning based on values, for a composite key, from the output data from the operation that feeds the user-defined table function; and wherein specifying comprises specifying range partitioning of input data to the operation that feeds the user-defined table function, based on values, from the input data, for the composite key.

7. The method of claim 1, wherein the partitioning required by the user-defined table function is hash partitioning based on values, for a composite key, from the output data from the operation that feeds the user-defined table function; and wherein specifying comprises specifying range partitioning of input data to the operation that feeds the user-defined table function, based on values, from the input data, for a first key from the composite key.

8. The method of claim 1, wherein the partitioning required by the user-defined table function is range partitioning based on values, for a composite key, from the output data from the operation that feeds the user-defined table function, and wherein the partitioning of the output data from the operation that feeds the user-defined table function is based on range partitioning based on values, from the output data, for the composite key.

9. The method of claim 1, wherein the partitioning required by the user-defined table function is range partitioning based on values, for a composite key, from the output data from the operation that feeds the user-defined table function; and wherein specifying comprises specifying hash partitioning of input data to the operation that feeds the user-defined table function, based on values, from the input data, for the composite key.

10. The method of claim 1, wherein the partitioning required by the user-defined table function is range partitioning based on values, for a composite key, from the output data from the operation that feeds the user-defined table function; and wherein specifying comprises specifying hash partitioning of input data to the operation that feeds the user-defined table function, based on values, from the input data, for a first key from the composite key.

11. The method of claim 1, comprising:
registering, with a database server, a function definition corresponding to the user-defined table function, wherein the function definition specifies a cluster type and one or more keys, wherein output from the user-defined table function is clustered based on the cluster type and the one or more keys.

12. The method of claim 11, comprising:
while generating the execution plan for the database statement, determining, based on the specified cluster type and the one or more keys, whether clustering of output data from the user-defined table function is compatible with clustering needed by a second operation or a second function that is fed by the user-defined table function; and
if the clustering of the output data from the user-defined table function is compatible with the clustering needed by the second operation or the second function that is fed by the user-defined table function, then specifying, in the execution plan, execution of both (a) the user-defined table function and (b) the second operation or the second function that is fed by the user-defined table function, by a same set of processes.

13. The method of claim 1, comprising:
registering, with a database server, a function definition corresponding to the user-defined table function, wherein the function definition specifies an order type and one or more keys, wherein output from the user-defined table function is ordered based on the order type and the one or more keys.

14. The method of claim 13, comprising:
while generating the execution plan for the database statement, determining, based on the specified order type and the one or more keys, whether ordering of output data from the user-defined table function is compatible with ordering needed by a second operation or a second function that is fed by the user-defined table function; and
if the ordering of the output data from the user-defined table function is compatible with the ordering needed by the second operation or the second function that is fed by the user-defined table function, then specifying, in the execution plan, execution of both (a) the user-defined table function and (b) the second operation or the second function that is fed by the user-defined table function, by a same set of processes.

15. A system comprising:
memory; and
one or more processors coupled to the memory and configured to execute one or more sequences of instructions for managing compilation of a database statement that includes a user-defined table function that requires partitioning of data input to the user-defined table function, wherein execution of the one or more sequences of instructions by the one or more processors causes the one or more processors to perform the steps of:
while generating an execution plan for the database statement, determining whether a partitioning of output data from an operation that feeds the user-defined table function is compatible with the partitioning required by the user-defined table function; and
if partitioning of the output data from the operation that feeds the user-defined table function is compatible with the partitioning required by the user-defined table function, then specifying, in the execution plan, execution of both the operation that feeds the user-defined table function and the user-defined table function by a same set of processes;
wherein the user-defined table function is a non-native function that has been registered with a database system that manages compilation of the database statement; and
wherein the partitioning required by the user-defined table function is specified in a function definition corresponding to the user-defined table function.

16. A system for managing compilation of a database statement that includes a user-defined table function that requires partitioning of data input to the user-defined table function, the system comprising:
means for determining, while generating an execution plan for the database statement, whether a partitioning of output data from an operation that feeds the user-defined table function is compatible with the partitioning required by the user-defined table function; and
means for specifying, in the execution plan, execution of both the operation that feeds the user-defined table function and the user-defined table function by a same set of processes if partitioning of the output data from the operation that feeds the user-defined table function is compatible with the partitioning required by the user-defined table function;
wherein the means for determining and the means for specifying include one or more processors operatively coupled to one or more storage devices;
wherein the user-defined table function is a non-native function that has been registered with a database system that manages compilation of the database statement; and
wherein the partitioning required by the user-defined table function is specified in a function definition corresponding to the user-defined table function.

17. A computer-readable storage medium that stores instructions which, when executed by one or more processors, cause the one of more processors to perform the steps of:
while generating an execution plan for the database statement, determining whether a partitioning of output data from an operation that feeds the user-defined table function is compatible with the partitioning required by the user-defined table function; and
if partitioning of the output data from the operation that feeds the user-defined table function is compatible with the partitioning required by the user-defined table function, then specifying, in the execution plan, execution of both the operation that feeds the user-defined table function and the user-defined table function by a same set of processes;
wherein the user-defined table function is a non-native function that has been registered with a database system that manages compilation of the database statement;
wherein the partitioning required by the user-defined table function is specified in a function definition corresponding to the user-defined table function; and
wherein the method is performed by one or more computing devices.

18. The computer-readable storage medium of claim 17 further comprising instructions for:
specifying, in the execution plan, partitioning of input data to the operation that feeds the user-defined table function in a manner that is compatible with the partitioning required by the user-defined table function.

19. The computer-readable storage medium of claim 17, wherein specifying comprises specifying execution of both the operation that feeds the user-defined table function and the user-defined table function by a same set of processes, without specifying a redistribution operation on the output data from the operation that feeds the user-defined table function.

20. The computer-readable storage medium of claim 17, wherein the partitioning required by the user-defined table function is hash partitioning and the partitioning of the output data from the operation that feeds the user-defined table function is range partitioning.

21. The computer-readable storage medium of claim 17 further comprising instructions for:
registering, with a database server, a function definition corresponding to the user-defined table function, wherein the function definition specifies a cluster type and one or more keys, wherein output from the user-defined table function is clustered based on the cluster type and the one or more keys.

22. The computer-readable storage medium of claim 21 further comprising instructions for:
while generating the execution plan for the database statement, determining, based on the specified cluster type and the one or more keys, whether clustering of output data from the user-defined table function is compatible with clustering needed by a second operation or a second function that is fed by the user-defined table function; and
if the clustering of the output data from the user-defined table function is compatible with the clustering needed by the second operation or the second function that is fed by the user-defined table function, then specifying, in the execution plan, execution of both (a) the user-defined table function and (b) the second operation or the second function that is fed by the user-defined table function, by a same set of processes.

23. The computer-readable storage medium of claim 17 further comprising instructions for:
registering, with a database server, a function definition corresponding to the user-defined table function, wherein the function definition specifies an order type and one or more keys, wherein output from the user-defined table function is ordered based on the order type and the one or more keys.

24. The computer-readable storage medium of claim 23 further comprising instructions for:
while generating the execution plan for the database statement, determining, based on the specified order type and the one or more keys, whether ordering of output data from the user-defined table function is compatible with ordering needed by a second operation or a second function that is fed by the user-defined table function; and
if the ordering of the output data from the user-defined table function is compatible with the ordering needed by the second operation or the second function that is fed by the user-defined table function, then specifying, in the execution plan, execution of both (a) the user-defined table function and (b) the second operation or the second function that is fed by the user-defined table function, by a same set of processes.

* * * * *

UNITED STATES PATENT AND TRADEMARK OFFICE
CERTIFICATE OF CORRECTION

PATENT NO. : 7,577,637 B2 Page 1 of 1
APPLICATION NO. : 11/204409
DATED : August 18, 2009
INVENTOR(S) : Bhaskar Ghosh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 672 days.

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,577,637 B2 | Page 1 of 1 |
| APPLICATION NO. | : 11/204409 | |
| DATED | : August 18, 2009 | |
| INVENTOR(S) | : Bhaskar Ghosh | |

It is certified that error appears in the above-identified patent and that said Letters Patent is hereby corrected as shown below:

On the Title Page:

The first and sole Notice should read --

Subject to any disclaimer, the term of this patent is extended or adjusted under 35 U.S.C. 154(b) by 672 days.

On the Title Page, Item (56), under "Other Publications", line 10, delete "Functions13" and insert -- Functions --, therefor.

In column 6, line 41, delete "parallel-processing" and insert -- parallel processing --, therefor.

In column 11, line 10, delete "Propogation" and insert -- Propagation --, therefor.

Signed and Sealed this

Twenty-first Day of September, 2010

David J. Kappos
*Director of the United States Patent and Trademark Office*